Aug. 13, 1935.  H. E. OWENS  2,011,373
AUTOMATIC BRAKE ADJUSTER
Filed Oct. 12, 1934  2 Sheets-Sheet 1
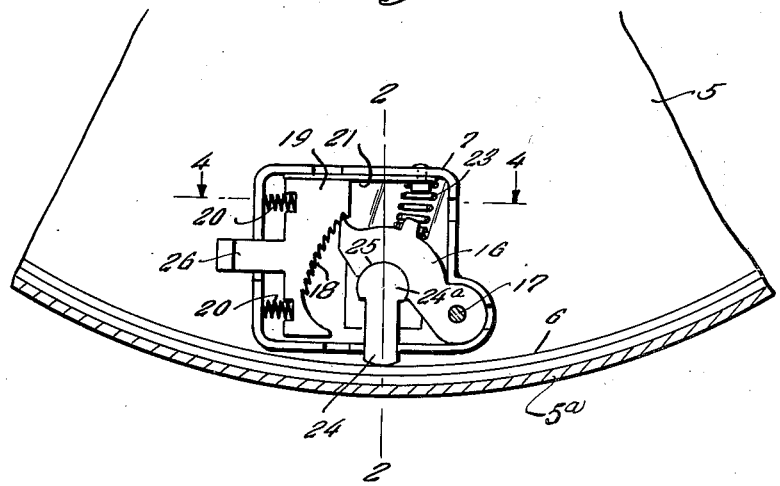
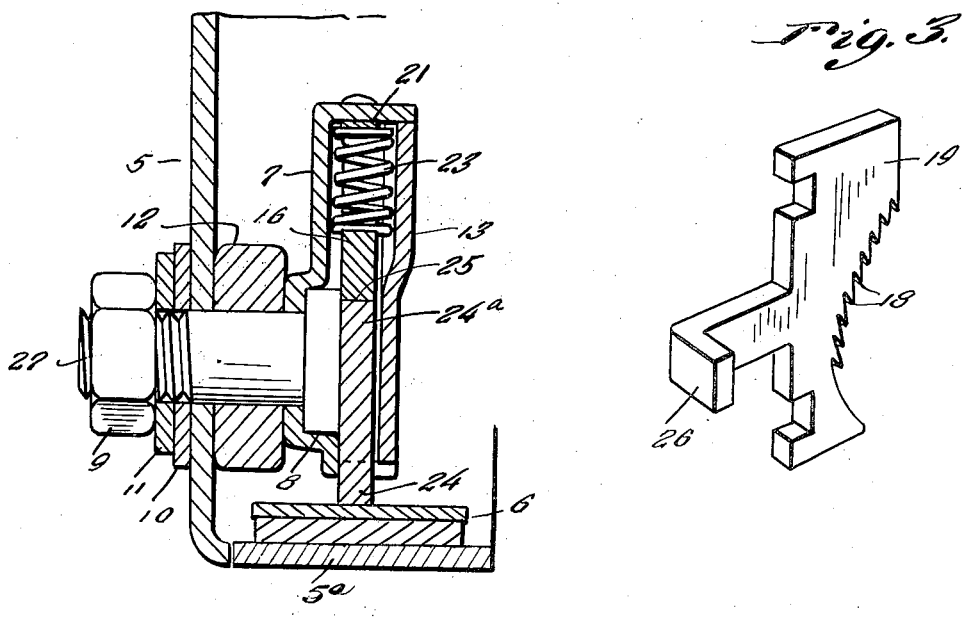
Inventor
H. E. Owens
By Clarence A. O'Brien
Attorney

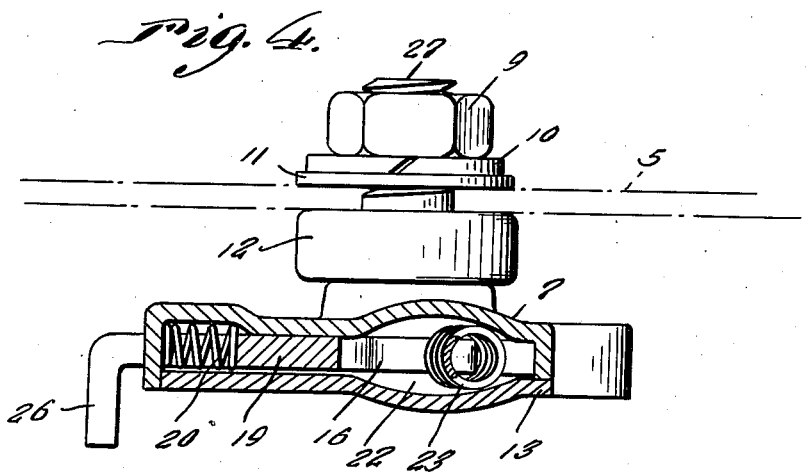
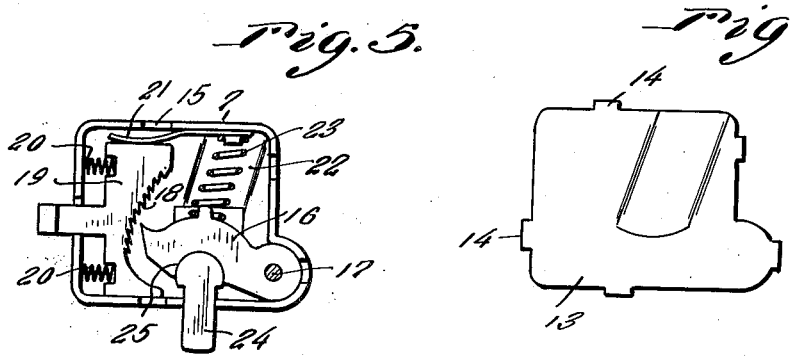
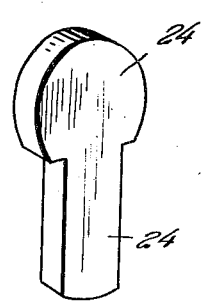

Patented Aug. 13, 1935

2,011,373

UNITED STATES PATENT OFFICE 2,011,373

AUTOMATIC BRAKE ADJUSTER

Howard Ervine Owens, Welch, W. Va.

Application October 12, 1934, Serial No. 748,139

5 Claims. (Cl. 188—79.5)

This invention is a device for application to vehicular wheel brakes and consists of a combination, construction and arrangement of parts which will serve to maintain the brakes adjusted at all times insuring proper clearance for the brake shoes with no drag.

A still further object of the invention is to provide a device of this character which is characterized by simplicity of construction and operation, and which can be made in any size or shape to fit any type of vehicular wheel brake, and which will be found especially adapted for use in conjunction with hydraulic brakes.

The invention together with its objects and advantages will be best understood from a study of the following description taken in connection with the accompanying drawings wherein:

Figure 1 is an elevational view illustrating the application of the invention.

Figures 2 and 4 are detail views taken substantially on the lines 2—2 and 4—4 respectively of Figure 1.

Figure 3 is a perspective view of a rack member.

Figure 5 is an elevational view of the device with the cover plate removed.

Figure 6 is a plan view of the cover plate and,

Figure 7 is a perspective view of a plunger member.

Referring to the drawings by reference numerals it will be seen that 5 indicates generally a stationary backing plate while the reference numeral 6 indicates the brake shoe. The rim on the brake drum is indicated at 5a.

In accordance with the present invention the automatic adjuster consists of a casing 7 that is secured to the backing plate 5 in proximity to the shoes 6 through the medium of a bolt 27. The shoes 6 are carried by the backing plate 5. The bolt has a squared head that fits in a substantially rectangular recess 8 provided internally of the casing 7. On the outer end of the bolt is provided a lock nut 9, a washer 10, and a lock washer 11. Disposed between the backing plate 5 and the casing 7 is a spacer block 12 that is apertured to accommodate the bolt as clearly shown in Figure 2. For the open side of the casing 7 there is provided a cover plate 13 the latter being provided with tongues 14 that are accommodated in notches 15 provided in the rim or peripheral wall of the casing 7 and which are secured in the notches in any suitable manner.

A ratchet dog 16 is pivoted in a lower corner of the casing 7 as at 17 and has its free end engageable with an arcuate series of teeth 18 provided on a floating rack bar 19. The bar 19 is normally urged toward the dog 16 through the medium of suitably arranged coil springs 20, and is normally urged downwardly through the medium of a leafspring 21 anchored at one end to the top of the casing 7. The casing 7 and end plate 13 at corresponding corners have outwardly bulged diagonal portions merging to form a substantially cylindrical chamber or recess 22 for a coil spring 23 that bears against the upper wall of the casing 7 and the dog 16 normally urging the dog 16 downwardly. A brake shoe engaging plunger 24 comprises a substantially rectangular shank like portion operating through a suitable opening provided in the bottom of the casing 7, and provided at its inner end with a rounded head 24a that fits in a semi-circular notch 25 provided in the lower edge of the dog 16 intermediate the ends of the dog. The plunger is normally urged through the medium of the spring 23 acting on the dog 16 into engagement with the brake shoe 6 for in turn urging said shoe toward the rim 5a of the brake drum.

From the above it will be apparent that as the brake shoe wears the same is forced toward the rim 5a of the drum by the plunger 24 that is normally urged to a projected position by action of spring 23 upon the dog 16. As dog 16 rotates under action of spring 23 in an anti-clockwise direction the free end thereof moves over the ratchet teeth 18 and engages therewith in such a manner as to prevent retrograde movement of the dog 16. Also, as the brake shoe wears and the dog 16 moves as just explained the rack bar will tend to move toward the bottom of the casing under action of the spring 21 so that, with the dog 16 thus engaged with the rack bar 19 the pressure on the plunger 24, and consequently on the brake shoe will be maintained by the device. Thus with this device as the brake lining wears the brake shoe is moved toward the rim of the brake drum so as to eliminate clearance between the brake lining and the drum.

For resetting the part the rack 19 may be released by engaging a suitable tool with an arm 26 formed integral with the rack bar 19 and operating through a suitable opening provided in an end wall of the casing 7 as clearly shown in Figures 1 and 3.

Having thus described the invention, what is claimed as new is:

1. In combination with a vehicle brake including a backing plate, a brake drum and brake shoe an adjusting device including a casing mounted on the backing plate, a plunger slidable through an opening in the wall of the casing and engaging the brake shoe for moving the same into engagement with the rim of the brake drum, a spring pressed floating rack bar arranged in the casing, a pivoted dog in the casing having an end cooperating with the rack bar, and an intermediate portion bearing against the plunger for projecting the plunger and to hold the same in projected position, and spring means acting on the dog to move the same in a direction to project the plunger.

2. In combination with a vehicular wheel brake including a backing plate, a drum and a brake shoe, automatic brake adjusting means arranged within the drum and engageable with the shoe for moving the same toward the rim of the drum to prevent clearance between the drum and brake shoe incidental to wear on the shoe, said means including a casing, means for fixedly securing the casing to the backing plate, a plunger slidable through an opening in the wall of the casing and engageable with the brake shoe, a dog pivoted in the casing, an interfitting connection between the dog and plunger for moving the plunger incidental to the movement of the dog, a floating rack bar arranged in the casing and with which the free end of the dog is engageable, spring means in the casing and acting laterally and longitudinally on the rack bar, and other spring means engaged with the dog normally urging the same in a direction to project the plunger.

3. The combination with a vehicle brake including a brake drum, a stationary backing plate for the drum, and a brake shoe carried by the backing plate of a support fixed to the backing plate, a projectile dog pivoted to the support, a brake shoe engaging plunger slidably mounted on the support and engageable with the dog, and a rack bar movably mounted on the support and engageable with a portion of the dog to prevent retrograde movement of the plunger.

4. The combination with a vehicle brake including a brake drum, a stationary backing plate for the drum, and a brake shoe carried by the backing plate of a support fixed to the backing plate, a projectile dog pivoted to the support, a brake shoe engaging plunger slidably mounted on the support and engageable with the dog, a rack bar movably mounted on the support and engageable with a portion of the dog to prevent retrograde movement of the plunger, and means connected with the rack bar and extending exteriorly of the support for moving the rack bar free of the dog whereby the plunger may be retracted for the purpose of relining or adjusting the brake shoes.

5. In a brake adjuster, a support adapted to be mounted on a stationary backing plate of a brake drum in proximity to a brake shoe, a projectile dog pivoted to the support, a brake shoe engaging plunger slidably mounted on the support and engageable with the dog, and a rack bar movably mounted on the support and engageable with a portion of the dog to prevent retrograde movement of the plunger.

HOWARD ERVINE OWENS.